Patented Jan. 5, 1954

2,665,262

UNITED STATES PATENT OFFICE 2,665,262

COATING COMPOSITIONS FOR RECORDING MEDIA

Clifford J. Rolle, Tuckahoe, and William Van Kirk, Richmond Hill, N. Y., assignors to Interchemical Corporation, New York, N. Y., a corporation of Ohio No Drawing. Application August 4, 1950, Serial No. 177,772

5 Claims. (Cl. 260—31.2)

1

This invention relates to novel pressure-sensitive coated materials, such as paper, and other supporting sheets, and to methods of preparing them.

United States Patent No. 2,306,525, of December 29, 1942, discloses the method of making multi-tone coated materials comprising a base coated with films of coating compositions which have been allowed to "blush." The multi-tone effect is obtained by compacting portions of the dry film by means of heat and/or pressure, whereby the "blush" is destroyed at the portions where the film is compacted and is retained where the film has not been compacted.

The phenomenon of "blushing" is one well-known to the coating industry. While the unpigmented coating compositions which dry by evaporation of solvent (lacquers) generally dry down to smooth homogeneous transparent films, it is possible to produce non-homogeneous films by disturbing the solvent balance so that the binder becomes insoluble in the liquid mixture during the latter part of the drying process and remains insoluble thereafter. In such cases, the binder precipitates out in form of very small, discrete particles of transparent material, with air between the particles; the resultant film is translucent or opaque and appears white to the eye.

The method of producing such films from various cellulose derivatives and resins, either by proper choice of organic solvents, or by judicious use of water in the film are well-known in the art. The afore-mentioned patent relates to the discovery of producing multi-tone embossed sheets by applying a blushed, cellulose type film to a base and treating the composition with an embossing roller. The pressure exerted by the embossing roller compacts the blushed film and forces the air out, thereby yielding an entirely or partially clear film in the depressions formed by the embossing roller, while allowing the unembossed portions to retain the original blush. As a result, a multi-tone coating is obtained, varying from the original blushed color to the combined effect of the unblushed coating and the surface behind it.

Attempts of employing formulations of the general character disclosed in U. S. Patent No. 2,306,525 for the making of pressure-sensitive inkless recording media, akin to prior recording media consisting of a black-surfaced paper having a solvent-applied waxy or soap-like coating, were not entirely successful. Coatings of the above-mentioned formulations are not sufficiently pressure sensitive, even after addition of various softeners, to properly respond to a hand-operated stylus or to the stylus pressure of one of the usual recording instruments. According to the foregoing patent, the pressure exerted by the embossing roller in order to extinguish the blush is 2,000 pounds at 230° F. The addition of softener to operate at a lower pressure is limited by the fact that excessive amounts of the softener sweat out and produce a greasy surface.

We have found that inkless recording media of just the right pressure sensitivity can be produced by means of blushed vinyl type coatings. By dissolving 10 to 15 parts of a vinyl chloride-vinyl acetate copolymer having a molecular weight of about 10,000, in 30 to 45 parts of a highly volatile solvent, such as acetone or methyl ethyl ketone, producing the required solvent-nonsolvent balance by adding 25 to 40 parts of butanol and 12 to 18 parts of a softener, such as butyl stearate, in which the vinyl copolymer is not soluble to an appreciable degree, we obtained coating compositions having the proper stylus sensitivity. The coatings were not greasy, but for practical purposes the compositions were too low in viscosity and too fluid as to allow a uniform application to the base. In addition, the coatings were found to chalk in that particles, accumulated on the surface of the coatings, would come off when rubbing the finger or a fabric against the surface.

Upon adding finely powdered talc to one of the foregoing compositions in order to give it more body, we attained not only the desired increase in the viscosity which yielded improved and uniform coatings, but the addition of talc resulted in two other distinct and entirely unexpected effects. Although talc as such has no tinctorial strength and practically no hiding power, the hiding power of the coating composition was materially improved. While coatings without talc required wet film thicknesses of at least 8 to 9 mils to produce a satisfactory hiding effect, coating compositions having from 10 to 15 parts of talc per 100 parts of the lacquer were found to be about 15% more economical because they exhibited the identical degree of hiding power at a wet film thicknesses of only 6.5 to 7 mils. Entirely inexplicable, however, was the fact that the coatings became rub-fast upon addition of talc in the above-stated amounts. These improvements are accomplished without any appreciable decrease in stylus sensitivity.

A typical example of our invention is as follows: a lacquer is made from, 12.8 parts vinyl chloride-vinyl acetate copolymer
38.5 parts methyl ethyl ketone
33.3 parts butanol
15.4 parts butyl stearate
12.5 parts finely powdered talc By means of a doctor blade or in any other known manner the composition is coated on a dark-surfaced base, preferably onto a paper base which is somewhat absorbent for the solvent mixture but sufficiently impervious so that the vinyl copolymer does not strike through. Both the coating operation and the drying of the coated sheet are performed at room temperature, the drying preferably in a current of unheated air to speed up the rate of evaporation of the solvent. Drying takes from 1½ minutes in an air current to 8 minutes in still air. Forced drying at higher temperature, say at 140–150° F., is detrimental to the blush because it increases the solubility of the vinyl copolymer in the butanol and in the plasticizer with the result of producing a clear or partially clear instead of a blushed coating. On the other hand, the use of a heated stylus is recommended for obtaining recording where a minimum of stylus pressure is desirable or available.

We obtain the best results when using a vinyl chloride-vinyl acetate copolymer comprising about 85 to 88% vinyl chloride and having a molecular weight of about 10,000. Similar copolymers with a higher vinyl chloride ratio, say from 88.5 to 92, with or without the presence of hydroxyl groups from vinyl glycol, appear to be somewhat poorer in blush. Other such copolymers having molecular weights of say, 16,000, are less desirable because of their high viscosity. Although a paper web which is somewhat absorbent for the solvent mixture is the preferred base, the coating can be applied to non-absorbent media. Any solvent combination may be chosen which provides unbalance upon drying and gives the desired drying speed. The optimum amount of butyl stearate softener is from about equal amounts to one and one-half times the amount of vinyl resin. Lesser amounts cause an increased loss of pressure sensitivity whereas amounts above the indicated range tend to sweat out and to produce greasy surfaces. It is to be noted, however, that the amount of softener can be materially reduced or eliminated from coating compositions which are to be used in conjunction with a heated stylus.

In lieu of talc, various other inert powders, such as of aluminum hydrate, bentonite or silica can be added to the coating composition to increase the viscosity and to attain rub-fastness. Compositions with aluminum hydrate produce coatings which are more white than those comprising talc. Compositions comprising bentonite produce cream-colored coatings. While aluminum hydrate and bentonite can be used at the same ratio as talc, when silica is used, for best results the amount added should not exceed the amount of vinyl resin present in the lacquer.

The coating compositions may be tinted as desired and used with bases having a different, preferably darker shade.

Having described our invention, we claim:

1. In a coating composition for recording media consisting of a film forming binder and a solvent mixture capable of dissolving the binder and consisting of a rapidly evaporating solvent for the binder and a non-solvent for the binder which evaporates at a substantially lower rate than the rapidly evaporating solvent, the said solvent mixture being so proportioned that, on drying, the said binder precipitates in form of discrete particles with air between them, the improvement of using as binder 10 to 15 parts of vinyl chloride-vinyl acetate copolymer having a molecular weight of about 10,000, dissolving the said binder in a solvent mixture consisting of 30 to 45 parts of a solvent for the binder which is highly volatile and 25 to 40 parts of a non-solvent for the binder which is less volatile than the solvent for the binder, adding 12 to 18 parts of a softener in which the said binder is substantially insoluble, and adding to 100 parts of the foregoing composition 10 to 15 parts of a finely divided inert solid material of low tinting strength.

2. The improvement according to claim 1, the said added material being aluminum hydrate.

3. The improvement according to claim 1, the said added material being bentonite.

4. The improvement according to claim 1, the said added material being an amount of silica equal in weight to the vinyl chloride-vinyl acetate copolymer.

5. In a coating composition for recording media comprising in 100 parts of the composition 12.8 parts of a film forming binder, 15.4 parts of butyl stearate, and a solvent mixture consisting of 38.5 parts of methyl ethyl ketone and 33.3 parts of butanol, the improvement of using as binder a vinyl chloride-vinyl acetate copolymer having a molecular weight of about 10,000 and adding to the said 100 parts of the coating composition 12.5 parts of finely powdered talc.

CLIFFORD J. ROLLE.
WILLIAM VAN KIRK.

References Cited in the file of this patent
UNITED STATES PATENTS

| Number | Name | Date |
| --- | --- | --- |
| 2,407,668 | Leatherman | Sept. 17, 1946 |